(12) United States Patent
Charron

(10) Patent No.: US 6,802,473 B2
(45) Date of Patent: Oct. 12, 2004

(54) ORNITHOPTER WITH FLEXIBLE FUSELAGE

(76) Inventor: Richard Charron, 4529 Willow Pond Ct., E, West Palm Beach, FL (US) 33417

(*) Notice: Subject to any disclaimer, the term of this patent is extended or adjusted under 35 U.S.C. 154(b) by 135 days.

(21) Appl. No.: 10/172,413

(22) Filed: Jun. 14, 2002

(65) Prior Publication Data

US 2003/0230672 A1 Dec. 18, 2003

(51) Int. Cl.[7] .............................................. B64C 33/02
(52) U.S. Cl. .......................................... 244/11; 244/72
(58) Field of Search .............................. 244/11, 22, 72; 440/13–15

(56) References Cited

U.S. PATENT DOCUMENTS

| | | | | |
|---|---|---|---|---|
| 1,109,891 A | * | 9/1914 | Young ........................ 244/120 |
| 1,591,315 A | * | 7/1926 | Hunter ........................ 244/88 |
| 1,835,630 A | * | 12/1931 | Bowlus ........................ 244/72 |
| 2,156,898 A | * | 5/1939 | Lo Giudice .................. 244/72 |
| 4,139,171 A | * | 2/1979 | Harris .......................... 244/22 |
| 4,155,195 A | | 5/1979 | Leigh-Hunt |
| 4,793,573 A | * | 12/1988 | Keifer .......................... 244/72 |
| 5,708,232 A | * | 1/1998 | Nedderman, Jr. ............ 244/3.1 |
| 6,082,671 A | | 7/2000 | Michelson |
| 6,206,324 B1 | | 3/2001 | Smith |

* cited by examiner

Primary Examiner—Galen Barefoot
(74) Attorney, Agent, or Firm—McHale & Slavin, P.A.

(57) ABSTRACT

An ornithopter has the capability of slow speed flight as a result of vertical movement of its wings. Two sets of wings are provided with vertical movement of each set of wings 180 degrees out of phase for counterbalancing vertical forces on the fuselage. The direction of the flight path is changed by deflecting the fuselage.

18 Claims, 4 Drawing Sheets

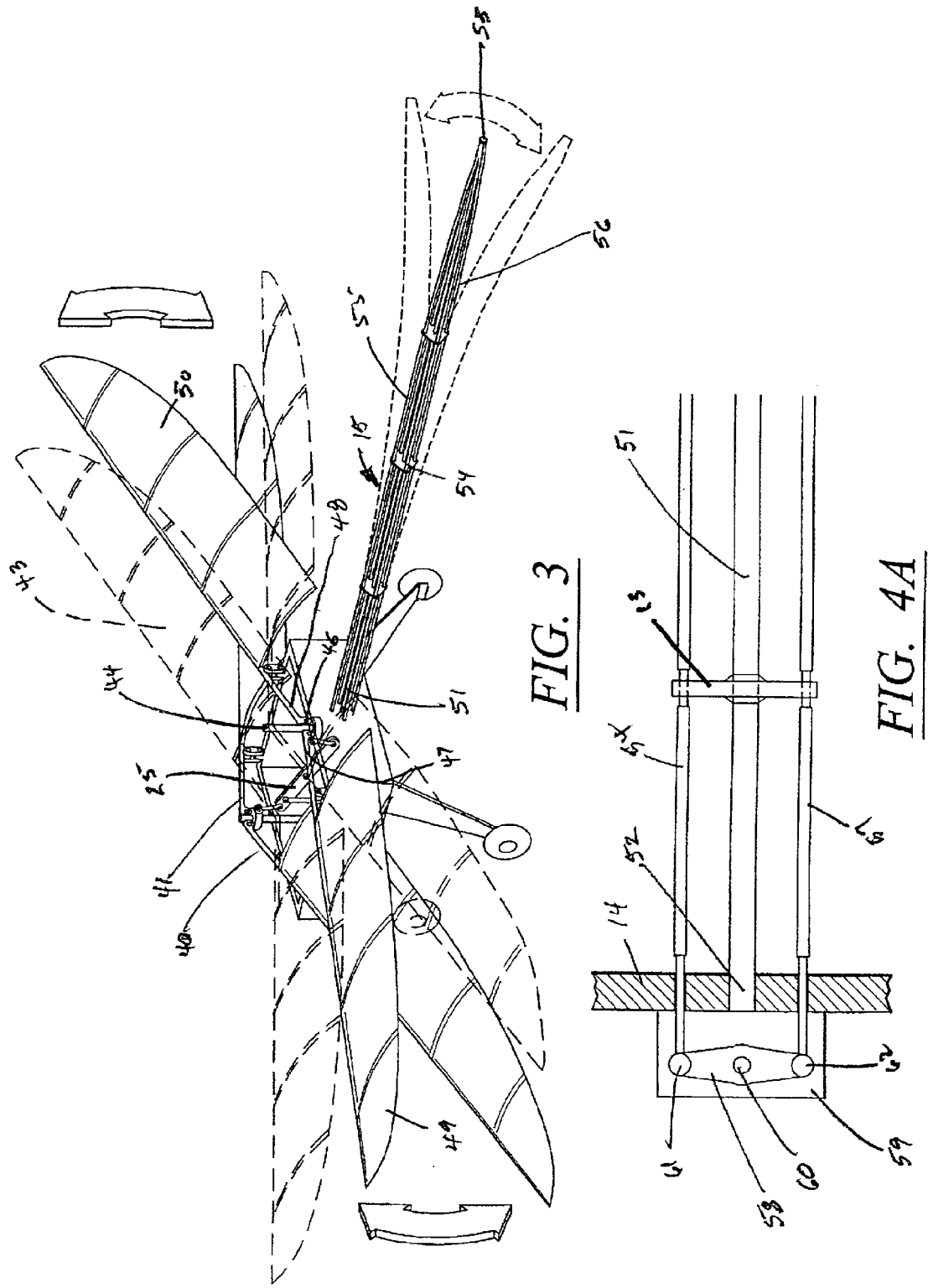

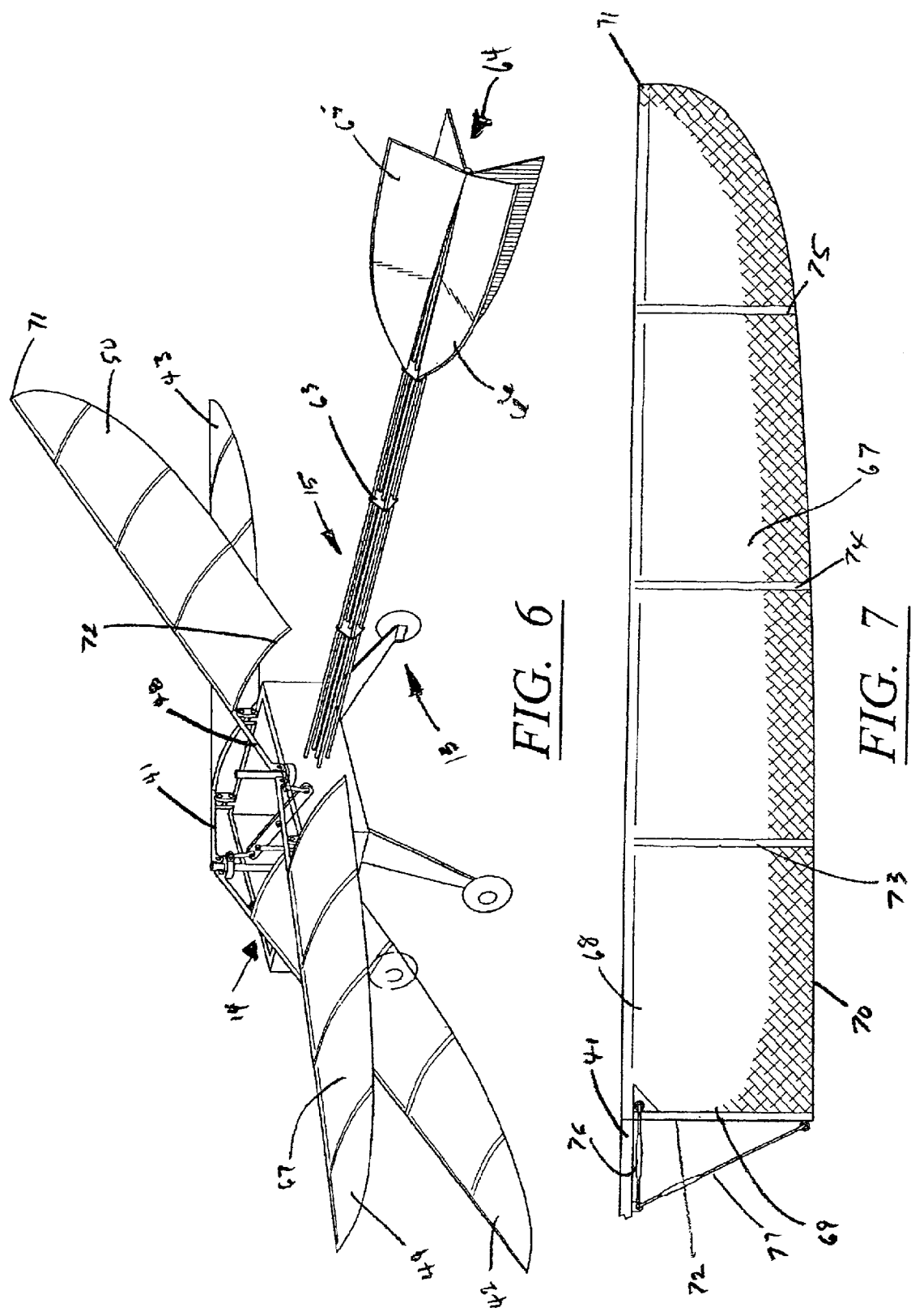

ORNITHOPTER WITH FLEXIBLE FUSELAGE

FIELD OF THE INVENTION

This invention relates to the field of ornithopter which develop lift and thrust through vertical movement of the wings to develop high aerodynamic propulsive efficiency. Further, the invention includes the provision of changing direction of flight by manipulating a flexible fuselage.

BACKGROUND OF THE INVENTION

There is a long history of aerial vehicles which attain flight through the movement of the wings. Of course, the most successful derivation of this concept is the helicopter. Modern helicopters and conventional aircraft have comparable characteristics of speed, lifting capacity and passenger comfort. These characteristics of the helicopter result from the rotary wing design wherein the wings or blades rotate in a plane parallel with the longitudinal axis of the fuselage.

In attaining the level of performance of current models, the helicopter has become a very complex machine requiring highly trained pilots. One of the most notable features of the helicopter is the balancing of dynamic rotational forces to attain controllable flight. The torque generated by the rotary wing acting against the fuselage must be managed by the pilot to attain straight and level flight. In addition, the pilot must simultaneously manipulate other flight controls similar to an airplane. Further, if the helicopter loses the function of the vertical tail rotor or ducted fan, which provides critical anti-rotational force, controlled flight is impossible.

Ornithopter also use a wing drive for flight. In contrast to the rotary wing of the helicopter, the ornithopter has reciprocating wings which move in a plane normal to the longitudinal axis of the fuselage. The ornithopter eliminates the complexity required for overcoming dynamic rotational forces of flight at the expense of flight speed and incidence of reciprocal vibration. However, the lifting capacity of the ornithopter can be substantial and flight operation is less complex than a helicopter.

Ornithopter can be useful in specialized tasks requiring slow moving observation or lifting or remote flight found in construction, forestry, oil and gas industry, and the military.

DESCRIPTION OF THE PRIOR ART

U.S. Pat. No. 6,206,324 to Smith discloses an ornithopter with multiple sets of computer controlled wings which may be programmed to reciprocate in various combinations. The angle of attack of the wings is controlled throughout each reciprocation to provide optimal lift and minimal drag.

The Michelson patent, U.S. Pat. No. 6,082,671, is an attempt to teach the concept of a mechanical insect. The wings are twisted, to optimize lift, during reciprocation by rotation of the wing spar.

A toy ornithopter is disclosed in U.S. Pat. No. 4,155,195. The two sets of wings of the device are mounted on the fuselage in a vertically overlapping design. The sets of wings are reciprocated by crank arms oriented at 90 degrees to each other and powered by a rubber band. The sets of wings reciprocate out of phase with each other in that as one set moves downwardly the other set is moving upwardly. The flight path is preset by adjusting the empennage before flight.

What the prior art lacks is an ornithopter with a simple drive system for the wings and a flexible fuselage that can control direction of flight.

SUMMARY OF THE INVENTION

Accordingly, it is an objective of the instant invention to teach an ornithopter having vertically moving wings for lift and thrust with a bending fuselage for flight path control.

It is a further objective of the instant invention to teach the use of a pivoting power beam linked to a power source and the wings for reciprocating the wings.

It is yet another objective of the instant invention to teach damping vertical vibration by counterbalancing the forces generated by the wings.

It is a still further objective of the invention to teach flight path control by moving the center of gravity.

It is another objective to teach the controllability of the vehicle at slow speeds, well below stall speed of fixed wing aircraft and below the speed at which a conventional empennage is effective, by flapping wings for lift and thrust and by moving the center of gravity in flight.

It is another objective of the invention to teach that the force required to support the lift of the front set of wings is counterbalanced by the force of the aft set of wings.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 3 is a perspective of the invention showing deflection of the aft fuselage in phantom lines;

FIG. 4A is a plan view, partially in section, of the control system for deflecting the aft fuselage;

FIG. 6 is a perspective of the ornithopter of this invention with an empennage; and FIG. 7 is a perspective of a wing panel of this invention.

DETAILED DESCRIPTION OF THE INVENTION

Figure 1:
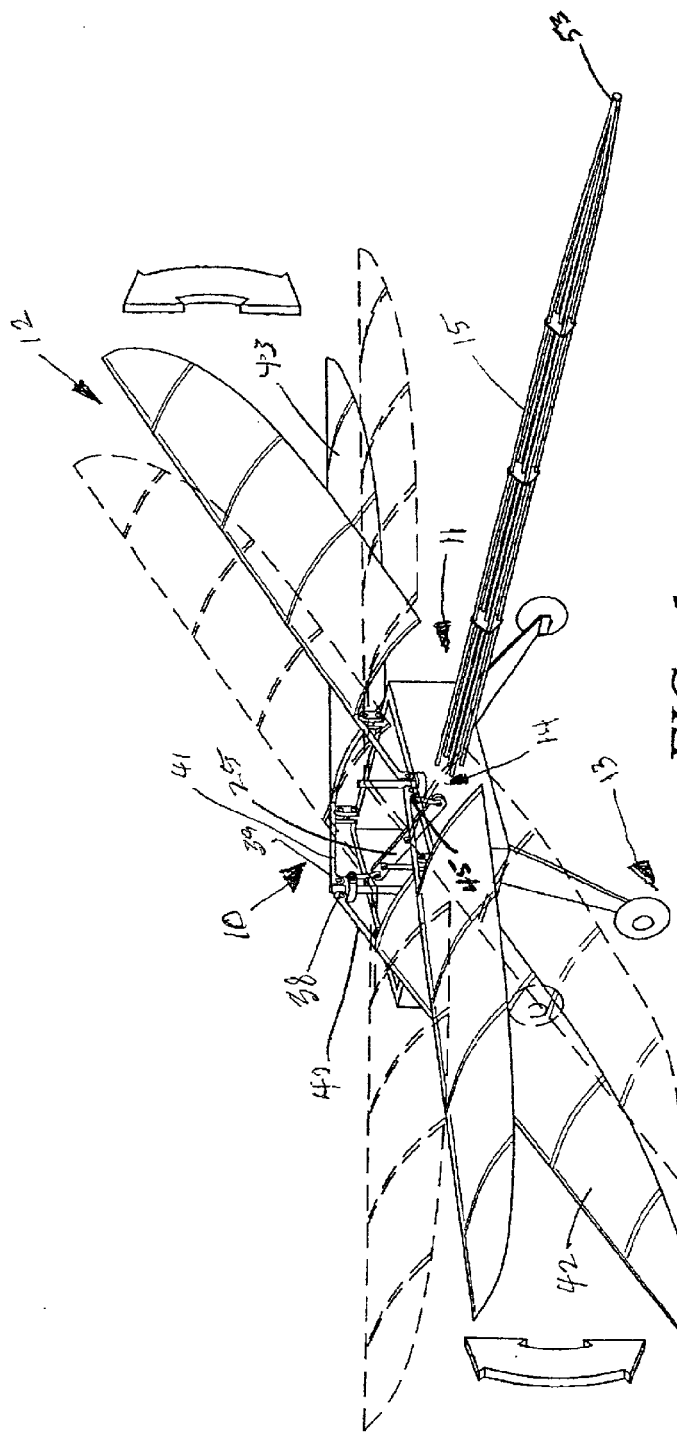
FIG. 1 is a perspective of the ornithopter of this invention showing relative direction of movement of the wings in phantom lines.
Figure 2A:
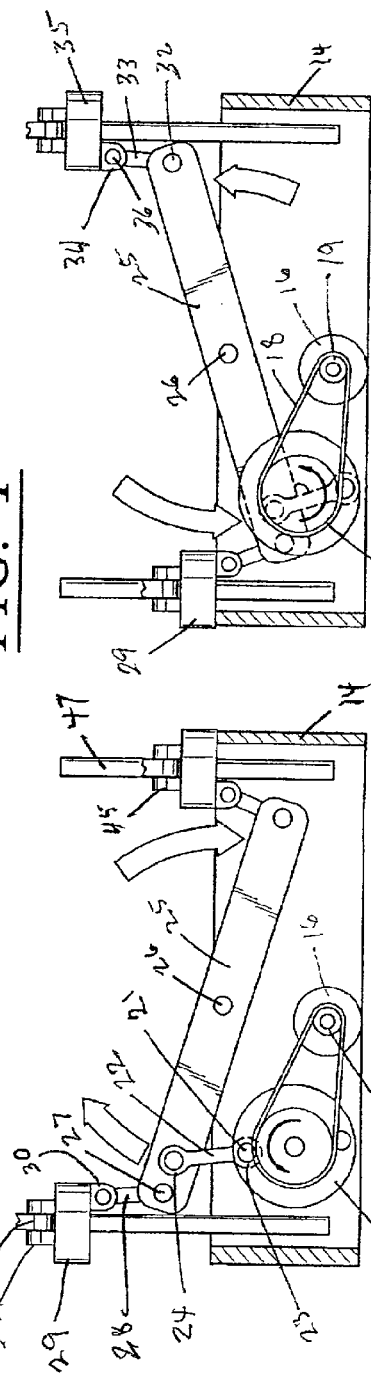
FIG. 2A is a side view, partially in section, of the forward fuselage and wing mounts in one phase of reciprocation.
Figure 2B:
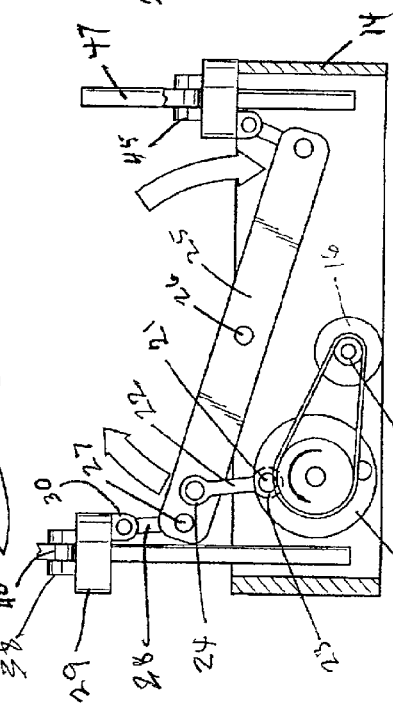
FIG. 2B is a side view, partially in section, of the forward fuselage in the phase of flight shown in FIG. 1.
Figure 5:
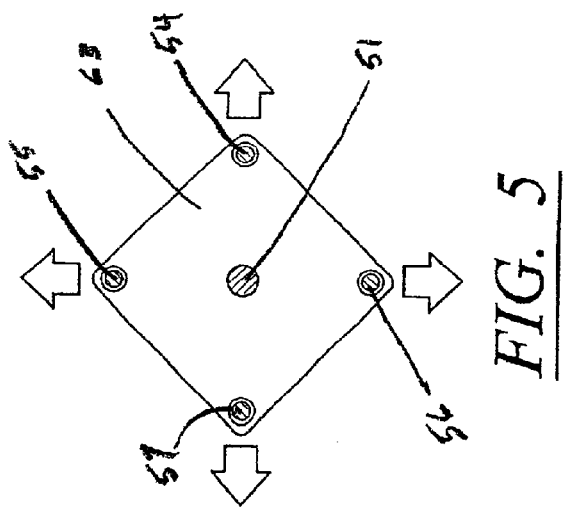
FIG. 5 is a plan view of a bracket for the control system.

The ornithopter 10 has a fuselage 11, wings 12 and landing gear 13, as shown in FIGS. 1,3, and 6. The fuselage 11 has a rigid forward portion 14 and a flexible aft portion 15. A passenger compartment (not shown) and/or a load carrying apparatus (not shown) would be attached to the rigid forward fuselage 14 in a conventional manner. A power source 16, by way of illustration, is shown in FIGS. 2A and 2B, as mounted within the forward fuselage 14. However, the power source may be mounted in other locations on the vehicle. Also, the power source is shown as a generator but any type of motor may be used, including fuel burning reciprocating engines, turbines, fuel cells, batteries or others.

The power source 16 drives a fly wheel 17 through a belt 18 and cooperating pulleys 19 and 20. Of course, the belt could be a chain and the pulleys could be sprockets, as a matter of choice. Also, a drive shaft could be used in place of the belt, with bevel gears, to drive the fly wheel 17.

The fly wheel 17 has an eccentrically mounted pin 21 connected to a drive link 22. Journal 23 permits drive link 22 to rotate around the pin 21 during rotation of the fly wheel. Another journal 24 is in the other end of the drive link 22. Journal 24 rotatably connects the drive link to the power beam 25. This arrangement results in reciprocation of the power beam in response to the rotation of the fly wheel. As an alternative (not shown), the power beam could be reciprocated by solenoids acting on the end(s) of the beam.

The power beam 25 is mounted on the rigid forward fuselage by a pin 26 located intermediate the length of the beam. As the drive link 22 reciprocates, the power beam 25 pivots about pin 26. As can be seen in FIGS. 2A and 2B, the drive link 22 attaches by journal 24 to the power beam 25 nearer one end to provide the reciprocation of the beam. A pin 27 is located on power beam 25 near the journal 24. The pin fits into a rotating journal on connecting link 28. Connecting link 28 rotatably connects power beam 25 and wing mount 29 through journal 30. This link smoothly transfers the reciprocating force of power beam 25 to the front set of wings 31.

The other end of power beam 25 includes pin 32 journaled into rear connecting link 33 for rotational movement. The rear connecting link 33 is rotatably connected to journal 34 on rear wing mount 35 by pin 36. Rear wings 35 are connected to the wing mount 35. As power beam 25 pivots about pin 26, the front set of wings move in one direction while the rear set of wings move in the opposite direction. The opposite movement of the sets of wings counterbalances the reciprocating forces on the fuselage and provides smooth flight. As can be seen by a comparison of FIGS. 2A and 2B, the distance of the throw of the ends of power beam 25 is equal. However, the additional linkage on the front wings dampens the transition of the change of direction of the wings.

Stationary shaft 37 is mounted on the forward fuselage 14 between the forward set of wings and extends vertically normal to the longitudinal axis of the fuselage. The wing mount 29 slidably engages the shaft 37 and moves along its length during reciprocation of the wings. The wing mount 29 carries journals 38 and 39 which rotatably connect to wing spars 40 and 41 of forward wings 42 and 43.

Rear stationary shaft 44 is mounted on the forward fuselage between the rear set of wings and extends vertically normal to the longitudinal axis of the fuselage. The wing mount 35 slidably engages the shaft 44 and moves along its length during reciprocation of the wings. The wing mount 44 carries journals 45 and 46 which rotatably connect to wing spars 47 and 48 of the rear wings 49 and 50.

The lift force of the forward set of wings supported by pin 27 of beam 25 is counterbalanced by the lift force of the rear wings at pin 32 of beam 25.

Both the rear and front sets of wings have a rotating connections 38, 39, 45 and 46 to the wing mounts 29 and 35, respectively, which also smooth out the reciprocating vibration forces.

In this manner, the pivoting of the power beam 25 drives the wing mounts 29 and 35, in opposite directions, translating the vertical movement to the flapping of the forward wings 42 and 43 with the rear wings 49 and 50.

In FIG. 3, the deflection of the flexible rear fuselage 15 is illustrated as a lateral movement of the free end of the fuselage in the yaw axis of the vehicle. In the slow flight regime of the ornithopter, a shift in the center of gravity coupled with asymmetrical increased drag will change the flight path. The deflection of the flexible fuselage is not severe enough to cause permanent bending or structural damage of the rear fuselage. The rear fuselage will tend to return to the longitudinal axis upon relief of the control input. The rear fuselage is made up of a central longeron 51 made of a material with a desired moment of elasticity and strength. The longeron is connected at one end 52 to the rigid fuselage 14 and the free end 53 is connected to the surrounding control elements 54, 55, 56 and 57.

Figure 4B:
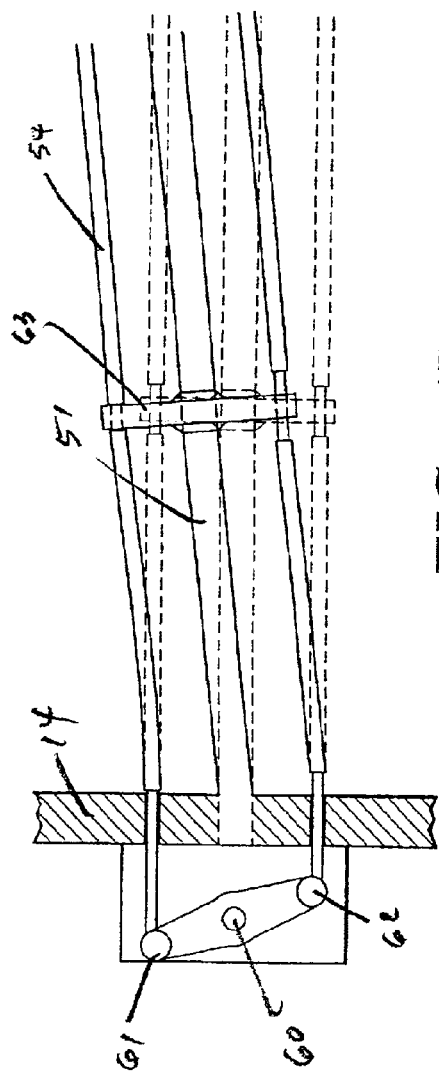
FIG. 4B is a plan view, partially in section, of the control system deflecting the aft fuselage for a right turn.
Figure 4C:
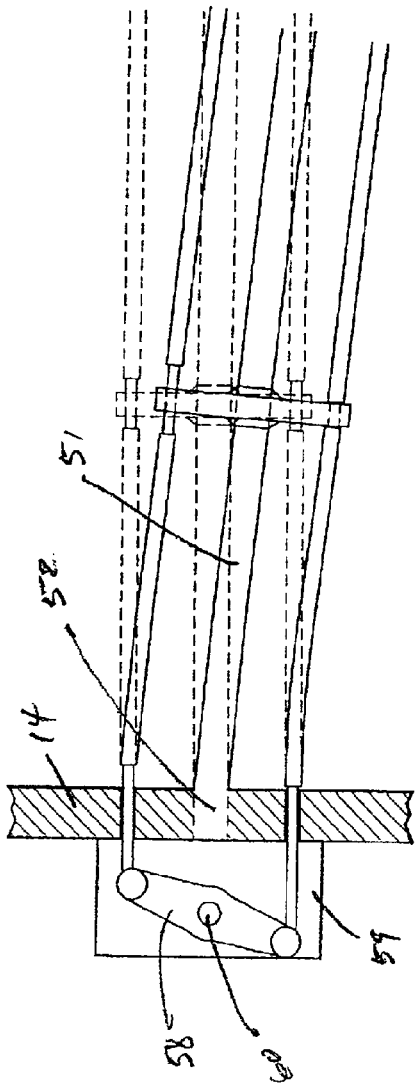
FIG. 4C is a plan view, partially in section, of the control system deflecting the aft fuselage for a left turn.

As shown in FIGS. 4A, 4B, and 4C, the control bar 58 is connected on a plate 59 mounted on the forward fuselage 14. The bar 58 has a center pin 60 which forms a rotatable connection with an aperture in the plate 59. Control input may be applied through the center pin 60 or through the ends of the control bar 58. In the Figures, the bar 58 is rotatably connected at 61 and 62 to the lateral control elements 54 and 57, respectively, for deflection in the yaw axis. Control elements 55 and 56 may be in the form of longerons or may be rotatably connected to another control bar (not shown) oriented at 90 degrees to the control bar 58 to operate the control elements in the pitch axis. The control elements may be in the form of control cables or control rods. To maintain spatial orientation of the control elements and the longeron 51, a series of brackets 63 are attached along the length of the longeron 51. The brackets have apertures through which the control elements pass.

In the modification shown in FIG. 6, the aft fuselage is provided with an empennage 64 with aerodynamic control surfaces 65 in the yaw axis and 66 in the pitch axis for added stability and control of the ornithopter at higher speeds. The control surfaces 65 may include movable rudders (not shown) and/or fixed trim tabs on the trailing edges. The control surfaces 66 may include movable elevators (not shown) and/or fixed trim tabs on the trailing surfaces.

In order to more closely mimic the efficiency of a bird's wing, the ornithopter has control of the angle of attack and the twist of the wings through each cycle. Each of the wings 12 of the ornithopter 10 has a flexible wing surface 67 in the nature of a sail. The wings surface 67 has a leading edge 68, a foot 69, and a trailing edge 70. The leading edge and the trailing edge intersect at the tip 71 opposite the foot 69. The leading edge of the wing surface is attached to the wing spars of the of the wings 12. As shown in FIG. 7, the wings surface 67 is attached to wing spar 41 of the front set of wings. The foot 69 of the wing surface forms the wing root and includes a batten 72 extending from the leading edge 68 to the trailing edge 70 for stiffening the wing surface material. To provide more shaping to the wing surface, battens 73, 74 and 75 are spaced from the foot to the tip. The battens may be made from any light weight material that has the requisite flexibility and strength to reinforce and hold the desired shape of the wing surface.

To provide adjustability of the twist in the wings a down haul 76 is attached to the foot of the wing surface and extends parallel to the spar. Added tension on the down haul 76 tends to flatten the wing surface longitudinally. Such a control input is related to an increase in the relative wind speed. An vang 77 is attached to the batten 72 near the trailing edge of the wing surface and extends to the spar. By increasing the tension on the vang 77, the twist of the wing surface is flattened laterally. These control inputs could be set before flight or operated by flight controls during flight. In any event, the angle of attack of the wings and the drag may be adjusted by adjusting the twist of the wings.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An ornithopter for controlled flight by flapping wings comprising a forward fuselage with diametrically opposed movable wings, each of said wings having a spar, a root and a tip, said spar extending from said root to said tip, said spar pivotally attached to said forward fuselage, and an elongated aft fuselage connected at one end to said forward fuselage between said wings, a power source mounted on said forward fuselage and connected to said movable wings, said power source including a power beam pivotably connected to said forward fuselage intermediate its ends, said ends of said power beam reciprocating as said power beam pivots, at least one end of said beam linked to said spar of each of said wings whereby reciprocation of said ends of said power beam results in flapping of said wings.

2. An ornithopter of claim 1 further comprising an elongated stationary shaft attached at one end to said forward fuselage, a wing mount slidably connected to the other end of said stationary shaft, said wing mount pivotally connected to said spar of each of said wing near each of said roots and said wing mount linked to said at least one end of said power beam.

3. An ornithopter of claim 1 further comprising a fly wheel connected to said forward fuselage, said fly wheel linked to said at least one end of said power beam whereby rotation of said fly wheel reciprocates said ends of said power beam.

4. An ornithopter of claim 1 further comprising a second set of diametrically opposed wings, said second set of wings each having a second spar, a second root and a second tip, said second spar of said second set of wings pivotally linked to the other end of said power beam near each said second root.

5. An ornithopter of claim 4 further comprising a second elongated stationary shaft attached at one end to said forward fuselage, said second elongated stationary shaft located between said elongated shaft and said aft fuselage, a second wing mount slidably connected to said second elongated shaft, said second wing mount pivotally connected to each said second spar near each of said second wing roots and linked to an end of said power beam whereby reciprocation of said power beam results in reciprocation of the sets of wings 180 degrees out of phase.

6. An ornithopter of claim 1 further comprising said elongated aft fuselage having a free end, a control system mounted on said forward fuselage and extending toward said free end of said aft fuselage, said control system connected to said aft fuselage near said free end, said aft fuselage constructed of flexible material whereby operation of said control system will cause flexing of said aft fuselage laterally to effect a change in flight heading.

7. An ornithopter of claim 6 further comprising said aft fuselage having a plurality of tubes extending from said forward fuselage to said free end, said control system having a pivot bar pivotally mounted on said forward fuselage, said pivot bar having a first end and a second end, control cables attached at one end to said first and second ends of said pivot bar, the other end of said control cables attached to said aft fuselage near said free end whereby movement of said control bar causes said aft fuselage to flex.

8. An ornithopter of claim 7 further comprising said plurality of tubes held in spatial relationship to each other throughout their length by a plurality of spaced brackets fixed to said tubes.

9. An ornithopter of claim 8 further comprising a plurality of apertures in said brackets, said tubes extending through said apertures.

10. An ornithopter of claim 9 further comprising said control cables telescoped into said plurality of tubes, the ends of said control cables attached to a bracket near said free end of said aft fuselage.

11. An ornithopter of claim 1 further comprising a batten attached to said spar near said root, and a wing panel, said wing panel having a leading edge attached to said spar, a foot attached to said batten and a trailing edge extending from said foot to said tip, said wing panel having an angle of attack relative to said location of said batten about the circumference of said spar and a twist relative to the disposition of said wing panel and said spar.

12. An ornithopter of claim 11 further comprising said wing panel constructed of a flexible material, a down haul attached to said foot of said wing panel and said spar near said root, said down haul adapted to add tension to said flexible material thereby adjusting said twist relative to said spar.

13. An ornithopter for controlled flight by flapping wings comprising a forward fuselage with diametrically opposed movable wings, said wings each having a root and a tip, a power source mounted on said forward fuselage and connected to said movable wings, and an elongated aft fuselage connected at one end to said forward fuselage between said wings, said power source including a power beam pivotably connected to said forward fuselage intermediate its ends, said ends of said power beam reciprocating as said power beam pivots, at least one end of said beam linked to said root of each of said wings whereby reciprocation of said ends of said power beam results in flapping of said wings, each of said wings having a spar extending from said root to said tip, a batten attached to said spar near said root, and a wing panel, said wing panel having a leading edge attached to said spar, a foot attached to said batten and a trailing edge extending from said foot to said tip, said wing panel having an angle of attack relative to said location of said batten about the circumference of said spar and a twist relative to the disposition of said wing panel and said spar, said wing panel constructed of a flexible material, a down haul attached to said foot of said wing panel and said spar near said root, said down haul adapted to add tension to said flexible material thereby adjusting said twist relative to said spar, further comprising a vang attached to said spar near said root and to said boom, said boom vang adapted to change the angle between said boom and said spar thereby adjusting the twist of said wing panel.

14. An ornithopter for controlled flight by flapping wings comprising a fuselage having a longitudinal axis with a rigid portion and a flexible portion, diametrically opposed wings pivotally mounted on said rigid portion of said fuselage for reciprocation normal to said longitudinal axis, a flight control system connected to said rigid portion of said fuselage and said flexible portion of said fuselage having control elements extending along the longitudinal axis of said flexible portion of said fuselage whereby operation of said flight control system deflects said flexible fuselage portion laterally to change heading.

15. An ornithopter of claim 14 further comprising said flexible portion of said fuselage having a free end, an empennage attached to said free end, said empennage having control surfaces in the yaw axis and the pitch axis.

16. An ornithopter for controlled flight by flapping wings comprising a fuselage having a longitudinal axis, diametrically opposed wings pivotally mounted on said fuselage for reciprocation normal to said longitudinal axis, said wings having a wing surface with a leading edge movably connected to a spar and a trailing edge, an adjustable down haul connected to said leading edge and said spar whereby adjusting said down haul changes said wing surface angle of attack and twist.

17. An ornithopter of claim 16 further comprising an adjustable vang connected to said trailing edge and said spar whereby adjusting said vang changes said twist and angle of attack of said wing surface.

18. An ornithopter of claim 16 further comprising said fuselage having a rigid portion and a flexible portion, a flight control system connected to said rigid portion of said fuselage and said flexible portion of said fuselage, said flight control system having control elements extending along the longitudinal axis of said flexible portion of said fuselage whereby operation of said flight control system deflects said flexible fuselage portion from said longitudinal axis and causes a change of direction of controlled flight.

* * * * *